United States Patent [19]

Vinegar et al.

[11] Patent Number: 4,743,854

[45] Date of Patent: May 10, 1988

[54] IN-SITU INDUCED POLARIZATION METHOD FOR DETERMINING FORMATION PERMEABILITY

[75] Inventors: Harold J. Vinegar; Monroe H. Waxman, both of Houston, Tex.

[73] Assignee: Shell Oil Company, Houston, Tex.

[21] Appl. No.: 925,586

[22] Filed: Oct. 31, 1986

Related U.S. Application Data

[62] Division of Ser. No. 591,140, Mar. 19, 1984, Pat. No. 4,644,283.

[51] Int. Cl.$^4$ ............................ G01V 3/20; G01V 3/38
[52] U.S. Cl. ................................... 324/366; 324/362; 324/373
[58] Field of Search .................. 324/357, 362, 366, 373

[56] References Cited

U.S. PATENT DOCUMENTS

| | | | |
|---|---|---|---|
| 3,599,084 | 8/1971 | Bakamjian | 324/362 X |
| 3,902,113 | 8/1975 | Bridges et al. | 324/362 |
| 3,967,190 | 6/1976 | Zonge | 324/362 |
| 4,359,687 | 11/1982 | Vinegar et al. | 324/362 X |
| 4,467,642 | 8/1984 | Givens | 324/362 X |
| 4,583,046 | 4/1986 | Vinegar et al. | 324/373 |
| 4,686,477 | 8/1987 | Givens et al. | 324/366 |

OTHER PUBLICATIONS

Dakhnov, V. N. et al., Well Logging by Means of Induced Polarization (Electrolytic Logging), Promislovaya Geofizika pp. 46–82, 1952, Translation by Geo. V. Keller in The Log Analyst, Nov.–Dec. 1967, pp. 3–18.

Latishova, M. G., Relationship Between Induced Polarization and the Permeability of Sands, *Trudi Mne.*, 12, Gostoptekizadat (1953) pp. 25–79.

Worthington et al., Relevance of Induced Polarization to Quantitative Formation Evaluation, *Marine and Petroleum Geology*, 1984, vol. 1, Feb. pp. 14–26.

*Primary Examiner*—Gerard R. Strecker

[57] ABSTRACT

An in-situ method of determining the pore size distribution, capillary pressure curve, and permeability of a formation using induced polarization logging measurements. The induced polarization (IP) voltage decay curve is measured opposite the formation of interest and the voltage decay curve is decomposed into a series of relaxation times related to the pore size distribution. The capillary pressure curve and the permeability are approximated from the pore size distribution. The measurements can also be made in the frequency domain using various frequencies to obtain the variation in phase shift with frequency. The variation in phase shift with frequency can be correlated with previous core measurements to obtain the pore size distribution, capillary pressure curve and formation permeability.

26 Claims, 4 Drawing Sheets

4,743,854

IN-SITU INDUCED POLARIZATION METHOD FOR DETERMINING FORMATION PERMEABILITY

This is a division, of application Ser. No. 591,140, filed Mar. 19, 1984 now U.S. Pat. No. 4,644,283, issued Feb. 17, 1987.

BACKGROUND OF THE INVENTION

The present invention relates to an in-situ method for determining the pore size distribution, capillary pressure curve and permeability of a formation surrounding a well. These are all important considerations in deciding whether hydrocarbon-bearing formations are commercial. A formation may contain a large amount of hydrocarbon but if the pores are too small and the permeability is too low it may not be possible to produce the hydrocarbons commercially. Thus, the determination of the pore size distribution, capillary pressure curve, and permeability of the formation is an important consideration in determining whether a well which has penetrated a hydrocarbon-bearing formation should be completed. The expense of completing a well is, of course, considerable since the well must first be cased and production tubing and well-head equipment installed.

At present there are only two reliable methods for determining the pore size distribution, capillary pressure curve and permeability of a formation. The method used most often is to take cores from the formation during the drilling of the well and then to analyze the cores in a laboratory. Coring enables high precision laboratory measurements of capillary pressure and permeability. Coring, however, is very expensive and involves some risk. While coring a well, one does not have as much control over the well as when drilling with conventional rock bits and the possibility of sticking the drill string in the well is greatly increased during coring operations. Further, during coring operations, the penetration rates are greatly reduced, thus increasing the time required to drill the well to a target depth. In addition, measurements on core plugs may not be a good representation of the formation as a whole, since core plugs are small, discrete samples.

The only reliable logging method for determining pore size distribution, capillary pressure curves and permeability is the use of the nuclear magnetism logging (NML) tool. In this method the $T_1$ decay curve of protons magnetically polarized in the formation is recorded and then mathematically inverted to obtain a pore size distribution and an approximate permeability (J. D. Loren and J. D. Robinson, "Relations Between Pore Size, Fluid and Matrix Properties, and NML Measurements", Society of Petroleum Engineers Journal, September 1970, pages 268-278). The use of nuclear magnetism logging is commercially practiced and readily available. While the technique is available, it does have several disadvantages. Among the disadvantages are the small depth of investigation of the nuclear magnetism log (about 6 inches) and the requirement that the borehole fluid be treated with magnetized particles to eliminate the borehole mud response from the log. Normally, magnetite particles in suspension are added to the drilling mud to suppress the borehole response. This involves considerable expense and effort, because it is necessary to circulate the magnetite in the well to assure adequate mixing, and the circulated mud must be checked to verify that the nuclear magnetic response has been eliminated.

Another disadvantage of the nuclear magnetism log is that the signal is extremely weak, often requiring several measurements at a fixed location for signal averaging. Thus, a good NMR decay curve of the quality required for capillary pressure and permeability determination is usually not obtained while continuously logging. Another disadvantage of the NML is that the nuclear magnetism decay times are so short in some formations, for example in tight gas sands, that the signals cannot be measured by existing NML tools (J. A. Brown, L. F. Brown, J. A. Jackson, J. V. Milewski, B. J. Travis, "NMR Logging Tool Developments: Laboratory studies of Tight Gas Sands and Artificial Porous Material", SPE/DOE 10813, pages 203-208). This is a severe disadvantage because it is precisely the marginal, low permeability formations where accurate measurement of the permeability is required most. Still another disadvantage of the NML is that the permeability determined from nuclear magnetism is a three-dimensional average, because the polarized protons on the water molecules diffuse randomly until they relax at the pore walls. In many formations there is an order of magnitude difference between vertical and horizontal permeability. The NML results will yield a three-dimensional averaged permeability rather than a separate vertical and horizontal permeability. Yet another difficulty with nuclear magnetism logging is that in oil-bearing formations, both the protons in water and in oil contribute to the $T_1$ decay curve. Since the water phase and the oil phase have different decay rates, an unambiguous determination of pore size often cannot be made. In addition, the $T_1$ decay times depend on the character of the pore surface, such as hydrocarbon wetting, bound hydration ions and paramagnetic centers. As is well known in the art, these can all produce significant effects on the measured $T_1$ relaxation times (J. A. Glasel, "NMR Relaxation in Heterogeneous Systems", Nature 227, 704-705 (1970); R. J. S. Brown and I. Fatt, "Measurements of Fractional Wettability of Oilfield Rocks by the Nuclear Magnetic Relaxation Method", Pet. Trans. AIME 207, 262-264 (1956).)

A final problem in relating the NMR relaxation times to formation permeability is that the pores probed by NMR need not be hydraulically connected. Therefore an impermeable medium containing disconnected vugs could yield the same $T_1$ decay curve as a permeable rock containing connected pores.

SUMMARY OF THE INVENTION

The present invention provides a method using in-situ logging methods for measurement of the capillary pressure curve and formation permeability. The method utilizes an induced polarization logging tool, preferably a focused induced polarization logging apparatus and method such as described in copending application Ser. No. 505,623 filed on June 20, 1983 now U.S. Pat. No. 4,583,046 issued Apr. 15, 1986. In this patent application there is described an induced polarization logging tool having means for focusing the electrodes to provide either horizontal or vertical measurements of the induced polarization. Measurements of the logging tool are recorded at the surface in the form of time domain IP decay curves or in the form of phase shift versus frequency of the applied electric field.

The present invention has several advantages compared to the NML tool described previously. The focused electric field in this invention penetrates deep into the formation away from the borehole. In addition, the present method does not require any treatment of the borehole fluids. A major advantage is that the signal to noise in the present invention is sufficient that signal averaging is not required and a well can be logged continuously. Another advantage of the present invention is that the IP voltage decay times are long enough even in low marginal reservoirs. Still another advantage is that the ions polarized by the present invention move along the direction of the applied electric field, so that both horizontal and vertical permeability can be separately determined. Yet another advantage is that, unlike the NML, the IP log observes only the water and not the oil in the formation. This is because oil is substantially nonconducting. A final advantage is that, unlike the nuclear magnetic response, the IP response is measured only along conducting pathways through the formation; therefore, disconnected and dead-end pores, which do not contribute to permeability, are not measured by the IP logging tool.

The method of the present invention requires that the above mentioned logging tool be operated opposite the formation of interest to measure the time-domain IP decay curve. The time domain IP decay curve is decomposed by a computer algorithm into a set of exponential decays with different time constants. From the amplitude and time constant of each exponential, a pore size histogram is constructed. In particular, the relationship between diffusion constant D of sodium chloride electrolyte in aqueous solution (cm$^2$/sec), the displacement length r (cm), and the time constant t (sec) is used in the expression:

$$D = \frac{r^2}{t} \quad (1)$$

The value of the diffusion coefficient at the formation temperature is used in this expression. The diffusion constant of sodium chloride electrolyte is known to be $1.5 \times 10^{-5}$ cm$^2$/sec at 25° C., and the effect of temperature on the diffusion constant is well known. We have discovered that the displacement length r is substantially the same as the pore size in clastic rocks. Thus, the IP decay curve yields the distribution of pore sizes in the formation.

Once the distribution of pore sizes is known, an approximate value for formation permeability can be computed using various geometric models, which are well known in the art. By proper calibration with core plugs from the formation of interest, the response of the induced polarization logging tool can be made directly in permeability units.

An alternative method of the present invention is to operate the IP logging tool of the aforementioned patent in the frequency domain. This requires that the logging tool be operated at several substantially different frequencies adjacent to the formation of interest. The phase shift for each frequency is measured and plotted to obtain a curve representing the phase shift versus frequency over a substantial range of frequencies. This plot can also be obtained from the time domain IP decay curve described above using linear transform techniques well known in the art. The phase shift versus frequency curve can be decomposed into a set of amplitudes and time constants which are used with the above mentioned relation between diffusion constant D and displacement length r to obtain a pore size histogram.

A shortened form of the above procedure is to obtain the phase shift versus frequency plot as described above, and record the frequency ($f_{min}$) at which the phase shift starts to decrease rapidly toward zero with the frequency dependence substantialy as $f^{1.0}$. This frequency represents the largest pore size in the formation, again obtained from equation (1). Since the largest pores control the formation permeability, an approximate value of permeability can be obtained from the measurement of $f_{min}$ alone.

BRIEF DESCRIPTION OF THE DRAWINGS

The present invention will be more easily understood from the following description when taken in conjunction with the drawings in which.

DESCRIPTION OF THE PREFERRED EMBODIMENTS

Figure 1:
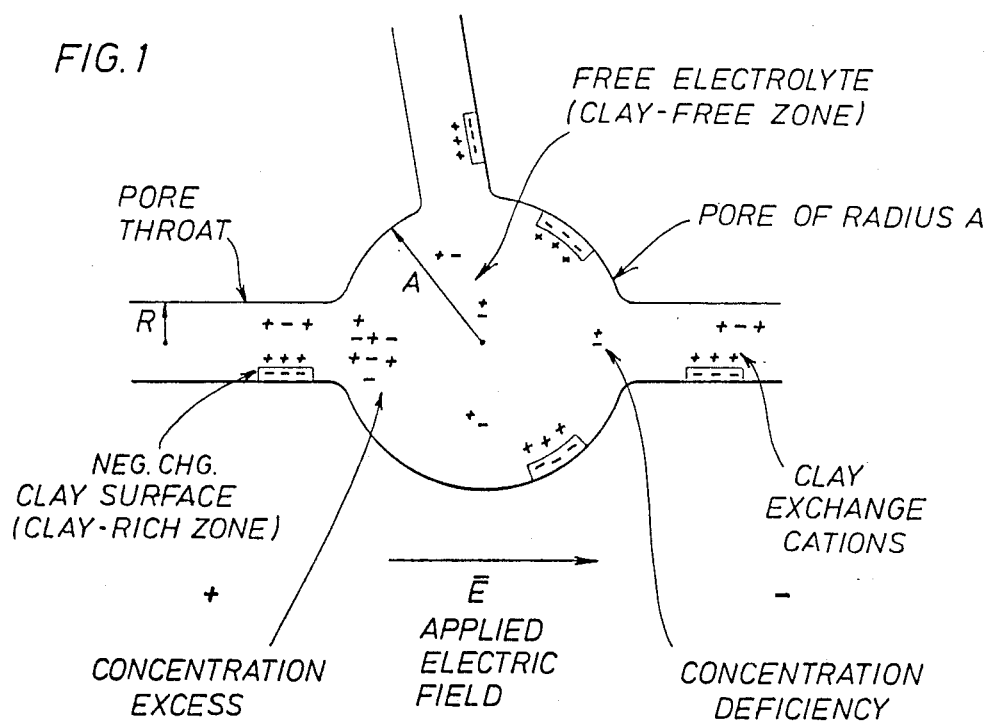
FIG. 1 represents an idealized pore in a shaly sand and the charges carried by clay counterions and by sodium and chloride ions in the free electrolyte.

According to the teachings of this invention, there is shown in FIG. 1 a schematic of a pore contained within a shaly sand. The pore is shown to be spherical in shape with radius A, and has a plurality of pore throats of radius R less than A which enter the pore. The pore contains a series of clay-rich and clay-free zones. The induced polarization logging tool of the aforementioned patent applies a substantially constant electric field to the formation in the direction shown in FIG. 1. The clay-rich zones act as cation-selective membranes and restrict the flow of negatively charged cations under the influence of the electric field. Thus, after sufficient time an electrochemical gradient is established across the clay-free zones by the buildup of electrolyte concentration at the edge of the clay-rich zone. When the electric field from the induced polarization logging tool is turned off, the concentration gradient disappears as the electrolyte ions diffuse back to their equilibrium positions. This, in turn, decreases the induced potential gradient which constitutes the induced polarization decay curve.

Figure 2:
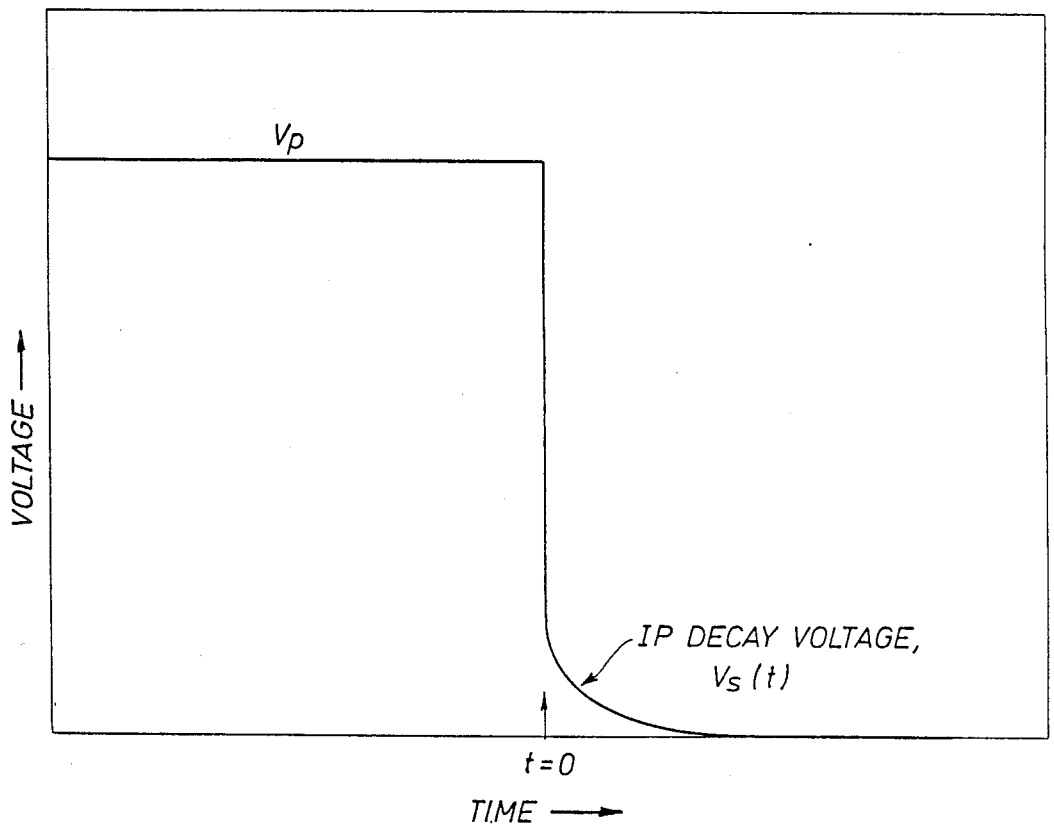
FIG. 2 represents a plot of the induced polarization decay voltage present in the formation as the induced polarization logging tool is operated.

A typical time-domain IP decay curve is illustrated in FIG. 2. The voltage Vp is the equilibrium voltage after the electric field has been applied for a substantial time, and the voltage $V_s(t)$ is the time domain IP decay voltage as a function of time. The voltage $V_s(t=0)$ is the IP decay voltage at the instant the electric field is terminated.

Figure 3:
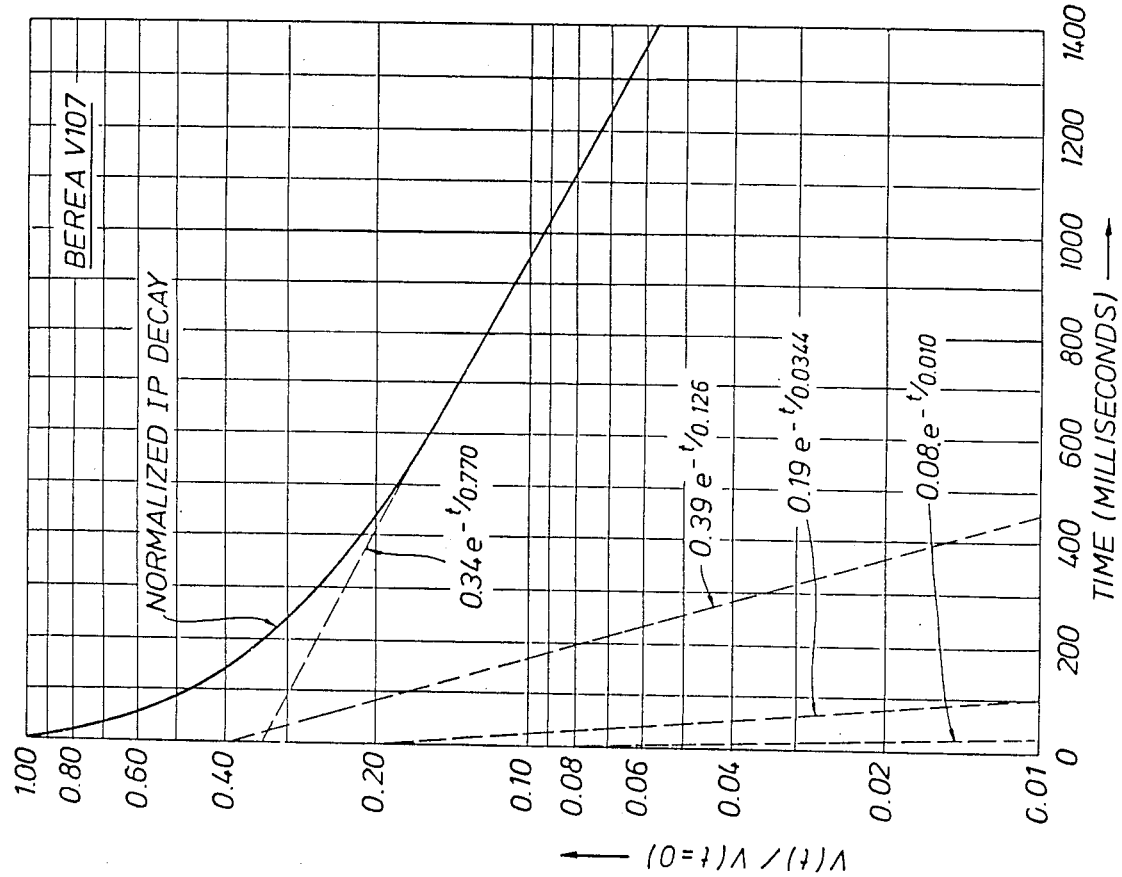
FIG. 3 represents the decomposition of the normalized induced polarization decay into a weighted series of four exponential decays.

If the porous medium consisted of clay-free zones all of the same size, the induced polarization decay curve would consist of a single exponential decay of time constant, t:

$$t = r^2/D \quad (2)$$

where D is the diffusion constant of electrolyte ions in the aqueous solution at formation temperature, and r is the length of the clay-free zone along the direction of the applied electric field. For sodium chloride solution at 25° C., $D = 1.5 \times 10^{-5}$ cm$^2$/sec; r is in centimeters, and t is in seconds. However, naturally-occurring sandstones have a wide range of clay-free distances, so that the observed induced polarization decay curve is a complex exponential decay consisting of a weighted series of exponentials with different time constants. The decomposition of the IP decay curve of FIG. 2 into four exponentials is shown in FIG. 3.

The longest time constant in the IP decay curve will be contributed by those ions with the longest relaxation distance. For times longer than the longest time constant the ions have enough time to return to their equilibrium positions and the IP decay voltage will have decreased to zero.

We have discovered that the clay-free relaxation distances are substantially the same as the pore size distribution. The explanation for this is that the clay occurs naturally as a pore lining material. In particular, referring to FIG. 1, the clay particles in the pore throat are the most effective membranes for the electrolyte contained in the pore. Thus, the scale of relaxation distances is substantially the same as the pore scale. This discovery has not been previously recognized in the art and is the basis for determining a pore size histogram from an induced polarization logging tool.

Figure 4:
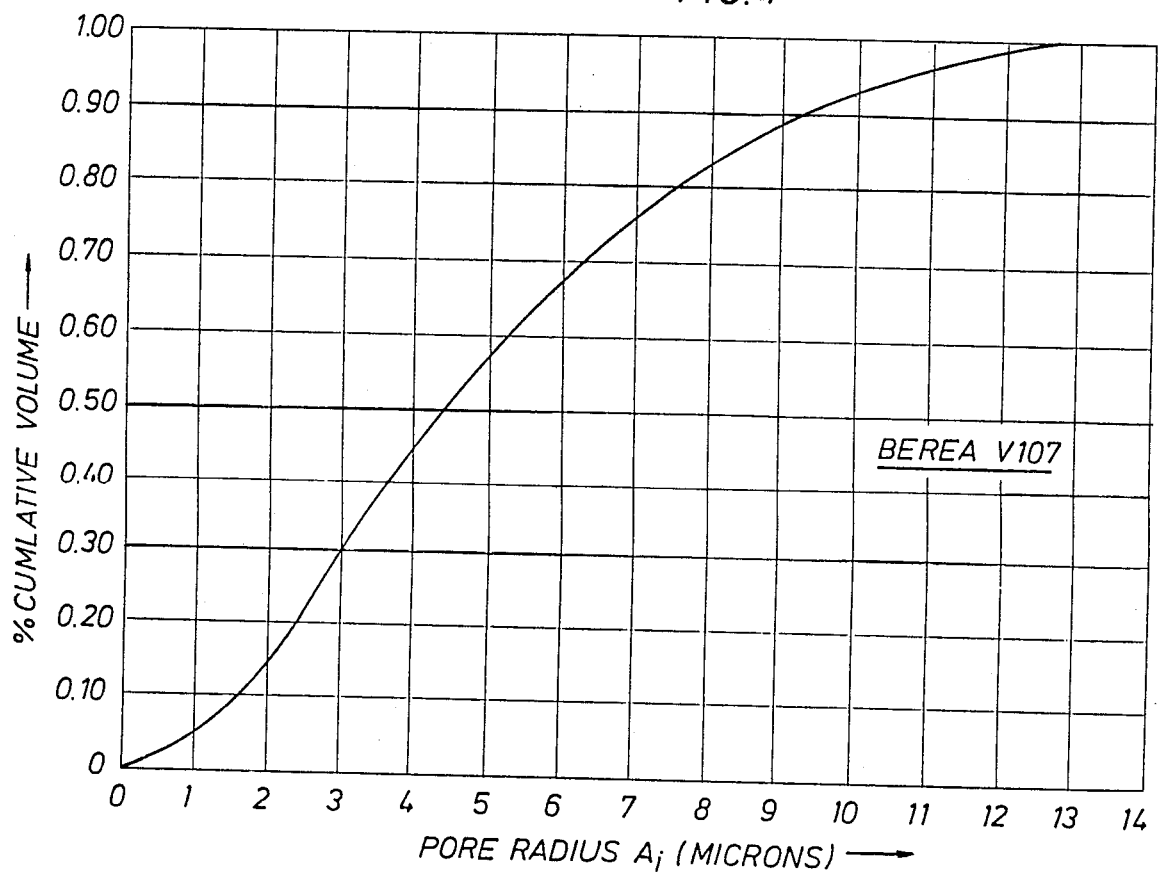
FIG. 4 represents the cumulative pore volume versus pore size curve calculated from the induced polarization voltage decay.
Figure 5:
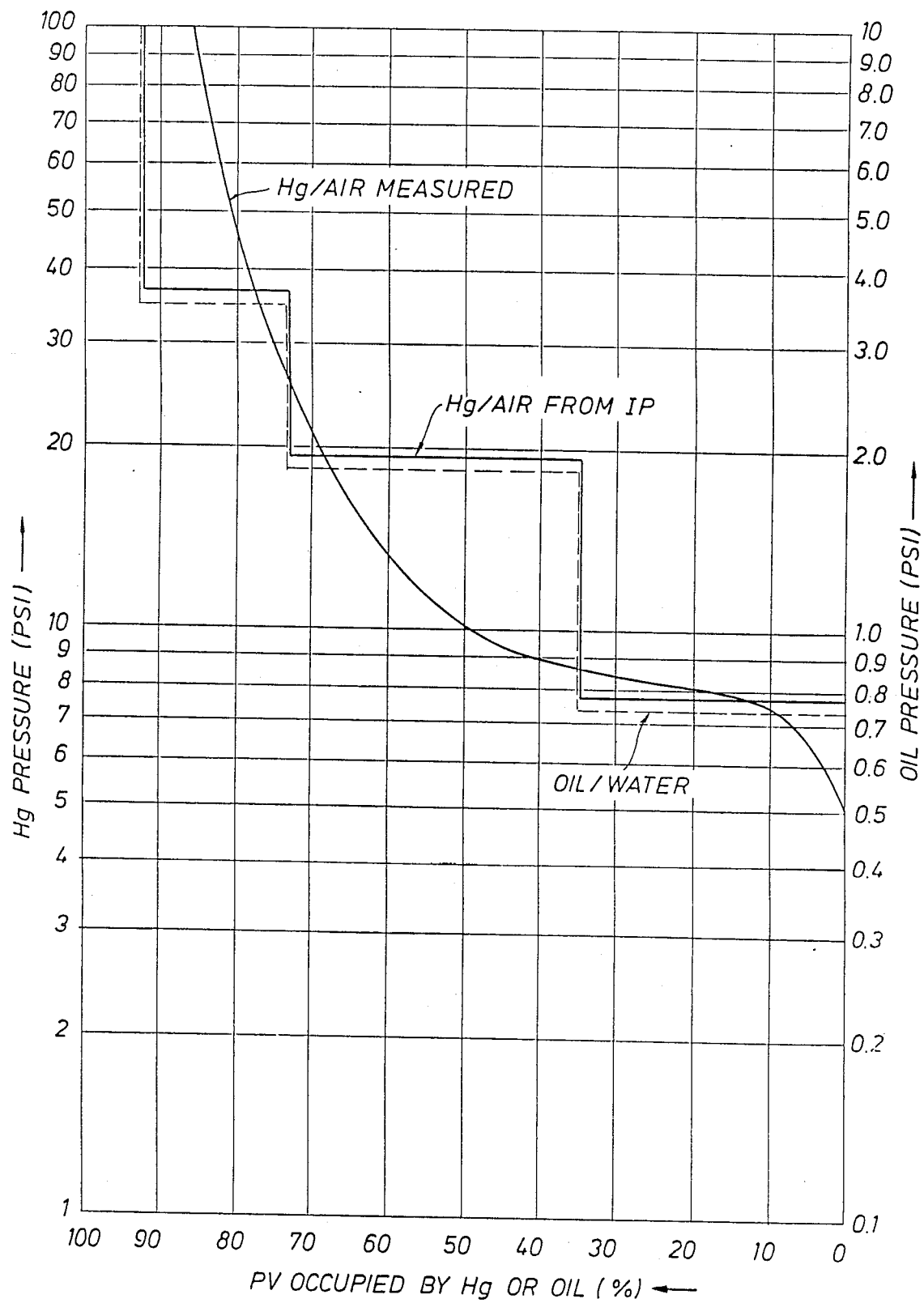
FIG. 5 represents a Hg/air and oil/water capillary pressure curve determined from the induced polarization voltage decay, compared with the measured Hg/air capillary pressure curve.

The preferred method of this invention is to measure an IP decay curve $V_s(t)$ opposite the formation using the focused IP logging tool or copending patent application. Although a focused induced polarization logging tool is the preferred embodiment, the method of this invention can also be applied to conventional induced polarization logging tools. The IP logging tool applies a substantially constant current into the formation until equilibrium is substantially reached. This time is typically in the range 0.01–100 seconds. The current is then terminated and the IP decay curve is measured. The IP decay curve $V_s(t)$ is normalized by dividing by $V_s(t=0)$ where $t=0$ is the instant at which the applied electric field is terminated. The normalized decay curve is then fit with a set of N exponentials of the form:

$$\frac{V_s(t)}{V_s(t=0)} = \sum_{i=1}^{N} S_i e^{-t/T_i} \quad (3)$$

where $S_i$ is the fraction of total pore volume in which the time constant equals $T_i$. The number of exponentials fit to the IP decay curve depends on the signal-to-noise of the IP decay curve. We have found that N between 3 and 5 gives satisfactory results for typical signal-to-noise conditions. FIG. 3 shows a typical example using four relaxation times for a Berea sandstone core. Each time constant is converted to a pore size using:

$$A_i = \sqrt{DT_i} \quad (4)$$

where $A_i$ is the radius of the i$^{th}$ pore size. This results in N data pairs of the form $(S_i, A_i)$ from which a pore size histogram and cumulative pore volume versus pore size curve can be constructed. FIG. 4 shows the cumulative pore volume curve determined from the IP decay curve derived from the aforementioned tool. If the additional assumption is made that $$P_{ci} = \frac{2 \gamma \cos \theta}{R_i} = \frac{2 \gamma \cos \theta}{(A_i/h)} \quad (5)$$

where $P_{ci}$ is the capillary pressure in dynes/cm$^2$, $\gamma$ is the interfacial tension between the wetting and non-wetting fluid (dynes/cm), $\theta$ is the contact angle, $R_i$ is the pore throat radius in cm, $A_i$ is the pore radius in cm, and h is a constant relating pore throat radius to pore radius, then a capillary pressure curve can be constructed from the N data pairs $(S_i, P_{ci})$. This assumption is based on the relation between $P_c$ and R for capillaries of circular cross section and by the assumption that pore throat radius and pore radius may be directly proportional to one another. The constant $\gamma$ is typically 35 dynes/cm for oil/water, and $\cos \theta = 1$ for water-wet rocks; $\gamma = 480$ dynes/cm for mercury/air and $\cos \theta = -0.7666$, as is well known in the art. The constant h is typically in the range 2.5–4 and may be determined more accurately from correlating capillary pressure measurements and IP decay curves on cores. FIG. 5 shows a Hg/air and oil/water capillary pressure curve determined from the induced polarization voltage decay of FIG. 3 (using $h = 2.5$), as well as the actual Hg/air capillary pressure curve measured for this sample.

Several empirical relations have been shown to reflect how permeability, K, depends on pore size and pore distribution. The simplest approximation is that:

$$K \approx \overline{<A_i^2>} \quad (6)$$

where K is the permeability in millidarcies and $\overline{<A_i^2>}$ is the mean square pore radius in square microns. A more accurate empirical ralation is:

$$K \approx c\phi^{m*} \overline{<A_i^2>} \quad (7)$$

where c is a constant, $\phi$ is the porosity which may be determined from a porosity log, m* is the cementation factor which is typically in the range 1.5–2.5, and $<A_i^2>$ is the mean square pore radius determined from the pore size distribution. In this relation, if K is in millidarcies, $A_i$ in microns, and $\phi$ is in decimal, then the constant $c = 20$. From the Waxman-Smits relation (M. H. Waxman, L. J. Smits, "Electrical Conductivity in Oil-Bearing Shaly Sands", Soc. Petroleum Engineers Journal, June 1968, pp 107–122):

$$\frac{1}{F^*} = \phi^{+m*} \quad (8)$$

where F* is the formation resistivity factor. The formation resistivity factor can be determined from the in-phase resistivity measured by the induced polarization logging tool if the formation salinity is known. Thus, if $C_w$ is the conductivity of the formation brine (mhometers$^{-1}$), $C_I$ is the in-phase conductivity (mhometers$^{-1}$) measured by the IP logging tool, then:

$$\frac{1}{F^*} = \frac{C_I}{C_w} \quad (9)$$

As an example of the application of these equations, the permeability computed for the Berea sandstone of FIG. 3 is 477 millidarcies using equation 7 and 604 millidarcies using equation 8 ($\phi=0.21$, $m^*=1.78$, $F^*=15.8$). The measured brine permeability is 425 millidarcies at 1.0 Molar NaCl.

Other permeability relations based on the shape of the capillary pressure curve are also well known in the art (W. R. Purcell, "Capillary Pressures—Their Measurement and the Calculation of Permeability Therefrom", Pet. Trans. AIME, February 1949, pp. 39–48; J. H. Thomeer, "Introduction of a Pore Geometrical Factor Defined by the Capillary Pressure Curve", Pet. Trans. AIME 219, 1960, pp 354—358). If core plugs are available, permeability measured on the core plugs can be used to calibrate the pore scale determined from the IP log measurements of relaxation time. Once the correlation between core measurements and in-situ measurements is made, monograms or tables can be provided for obtaining permeability directly from the borehole measurements. This correlation may be programmed into a computer algorithm so that the response of the induced polarization logging tool is displayed directly in permeability units.

Figure 6:
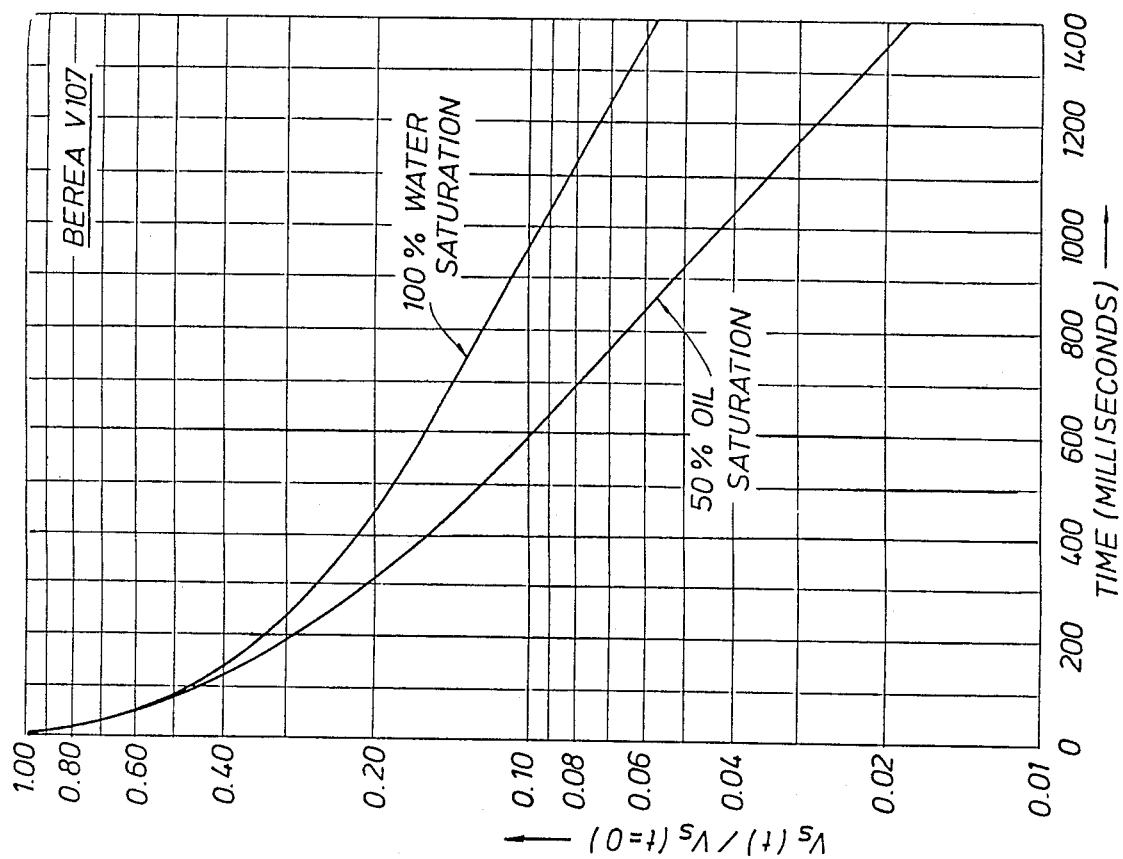
FIG. 6 represents the IP decay curves for the Berea sandstone 100% water-saturated and 50% oil-saturated.

When both water and oil are present in a water-set formation at capillary equilibrium, the oil phase occupies the larger pores and the water phase occupies the smaller pores. This results in a reduction in the IP decay curves at the longer times, corresponding to the larger pores entered by the oil phase. FIG. 6 shows the more rapid decay at long times for a Berea sandstone with 50% oil saturation relative to the same core at 100% water saturation. If equations 6 or 7 are utilized for an oil-bearing formation, the reduced permeability calculated will be indicative of the relative permeability to water at the particular oil saturation present in the formation.

From FIG. 6 it is evident that comparison of the IP decay curve for the 100% water-saturated core and the IP decay curve for the oil-bearing core can be used to determine the pore size entered by the oil phase. Thus, in FIG. 6 the oil phase has entered all pores larger than the pores corresponding to a relaxation time of 80 milliseconds. The 100% water-saturated core IP measurements can be obtained from core material from the formation of interest which has been extracted of brine and hydrocarbons and resaturated with formation brine. In addition, if capillary pressure curves are measured on the cleaned core material, the in-situ oil saturation can be determined by comparing the 100% water-saturated core IP measurement with the logging IP measurements. The capillary pressures can be computed for the relaxation time using equations (4) and (5). Entering the capillary pressure curve of FIG. 5 at this capillary pressure gives the in-situ oil saturation and the height of the oil column by well known techniques (E. J. Lynch, "Formation Evaluation", Harper and Row, New York, 1962, p. 43).

The method of the present invention also applies if a repetitive bipolar time-domain waveform or a bipolar time-domain waveform with dead time is utilized. As is well known in the art, a decay curve from these and similar waveforms can always be constructed by linear superposition of the basic step function response described above (J. R. Wait, "Overvoltage Research and Geophysical Applications", Pergamon Press, New York, 1959).

The use of a focused induced polarization logging tool has several advantages in accordance with the teachings of this invention. The IP decay curve can be obtained with the electric current from the aforementioned IP logging tool focused either horizontally or vertically. According to the teachings of this invention, since electrolyte diffusion occurs substantially in the direction of the applied electric field, separate horizontal and vertical pore size distributions and permeabilities will be obtained. If a conventional induced polarization looping tool without focusing is utilized, separate vertical and horizontal values cannot be determined. In addition, the depth of investigation, thin bed resolution, and borehole corrections are all poorer with a non-focused IP logging tool. Nevertheless the other teachings of this invention can still be applied to logging with a non-focused IP logging apparatus.

An alternative method of the present invention is to operate the IP logging tool in the frequency domain. This requires that the tool be operated at several substantially different frequencies in the low frequency range, preferably between $10^{-3}$ and $10^2$ Hz, and adjacent the formation of interest. The IP measurements at the different frequencies can be made either sequentially or simultaneously by using a superposition of the different discrete frequencies. The phase shift for each frequency is measured and plotted to obtain a curve representing the phase shift versus frequency over a substantial range of frequencies.

Figure 7:
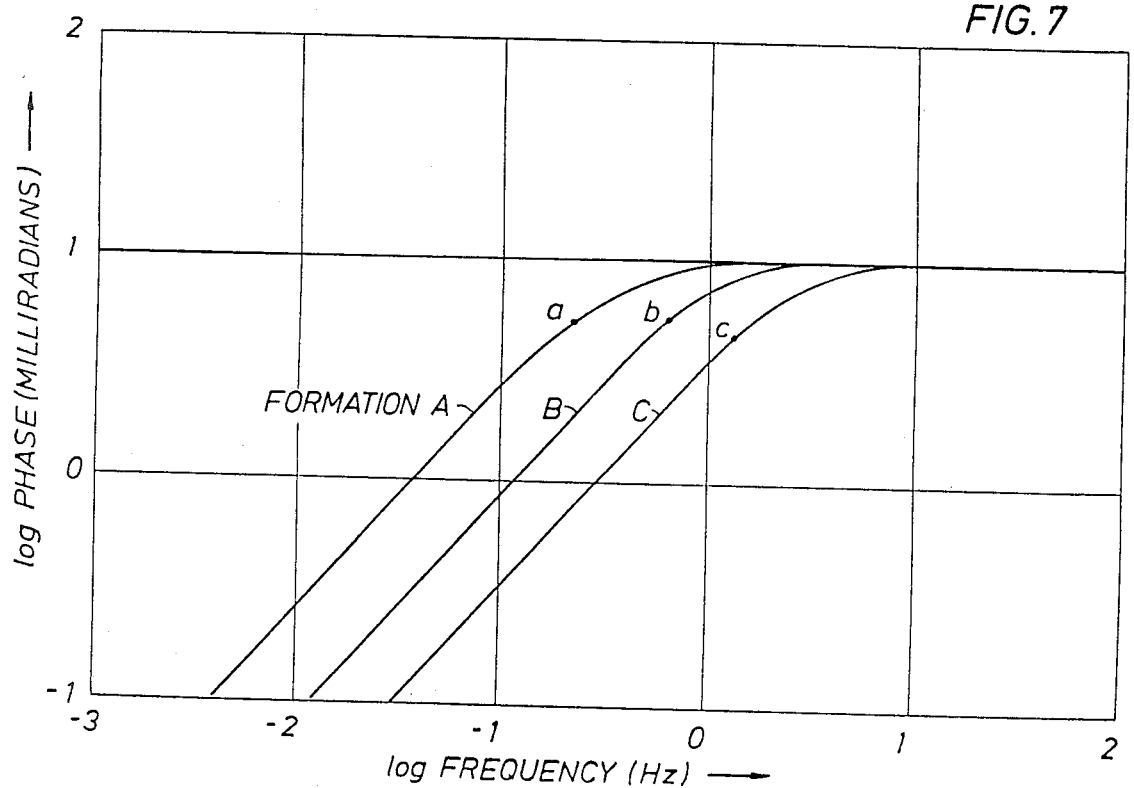
FIG. 7 represents a series of curves of phase shift versus frequency for various formations.

Referring to FIG. 7, there is shown a log-log plot of phase shift versus frequency for three different formations. The formation A has the largest pore dimensions, while the formation C has the smallest pore dimensions. Point a in FIG. 7 shows the frequency at which the phase shift in formation A starts to decrease at least as fast as $f^{1.0}$. This frequency corresponds to the longest time constant in the IP decay curve and also to the largest pore size in the formation.

The phase shift versus frequency curve can be decomposed into a set of amplitudes and time constants, using linear transform methods well known in the art. The amplitudes and time constants are the same as those from the IP decay curve, and the method of this invention proceeds as above to determine pore size histogram, capillary pressure curve, and permeability.

A shortened form of the above procedure is to obtain the phase shift versus frequency plot as described above, and measure the frequency, $f_{min}$, at which the phase shift starts to decrease substantially as $f^{1.0}$. This frequency $f_{min}$ can be used in the following simple approximation for formation permeability:

$$K \simeq \frac{10^8 D}{2 \pi f_{min}} \quad (10)$$

where K is the permeability in millidarcies, D is the diffusion coefficient in cm$^2$/sec, and $f_{min}$ is in Hz. Other empirical relations relating permeability to $f_{min}$ are also possible as derived from correlations between measured permeability on core plugs and $f_{min}$ determined from the IP log. This approach is illustrated in FIG. 7 wherein the phase versus frequency curves for three formations A, B and C are shown. The $f_{min}$ for the three formations are indicated at a, b and c, respectively.

What is claimed is:

1. A method for the in-situ determination of permeability of a formation, comprising the steps of:

logging the formation of interest with a time dependent induced polarization logging tool to produce transient induced polarization measurements;

converting the transient induced polarization measurements obtained by the logging tool to an induced polarization formation response function;

determining the pore size distribution from the induced polarization response function; and determining the permeability from the pore size distribution.

2. The method of claim 1 and in addition determining the capillary pressure histogram from the pore size distribution.

3. The method of claim 1 wherein said logging step consists of induced polarization measurements made in the time domain, and said response function is a time domain voltage response function.

4. The method of claim 3 wherein said logging step consists of induced polarization measurements made using a current-on time and current-off time in the range from one 1/100 to 100 seconds duration.

5. The method of claim 4 wherein said induced polarization (IP) time domain voltage response function is normalized by dividing by the IP decay voltage at the time the current flow is terminated, and the normalized response function is then fit with N exponentials in the expression:

$$\frac{V_s(t)}{V_s(t=0)} = \sum_{i=1}^{N} S_i e^{-t/T_i}$$

where $V_s(t)$ is the IP decay voltage at time t, $V_s(t=0)$ is the IP decay voltage at the time after the primary charging voltage is terminated and $S_i$ is the fraction of pore volume whose time constant equals $T_i$.

6. The method of claim 5 wherein a pore size distribution is determined from the equation:

$$A_i = \sqrt{DT_i}$$

where $A_i$ is the radius of the $i^{th}$ pore size of pore volume fraction $S_i$ for which the time constant equals $T_i$, and D is the diffusion constant of electrolyte ions in the formation brine in cm²/sec at formation temperature.

7. The method of claim 6 wherein a capillary pressure histogram consisting of data pairs ($P_{ci}$, $S_i$) is derived from the equations:

$$P_{ci} = \frac{2\gamma\cos\theta}{R_i} = \frac{2\gamma\cos\theta}{(A_i/h)}$$

where $P_{ci}$ is the capillary pressure in dynes/cm² for the $i^{th}$ pore throat size, $S_i$ is the pore volume fraction corresponding to $P_{ci}$, $\gamma$ is the interfacial tension between wetting and non-wetting fluids in dynes/cm at formation conditions, $\theta$ is the contact angle, $R_i$ is the pore throat radius in cm, and h is a constant relating pore throat radius to pore radius.

8. The method of claim 6 wherein the permeability K is derived from the equation:

$$K \cong \overline{<A_i^2>}$$

where K is the permeability, and $\overline{<A_i^2>}$ is the mean square pore radius.

9. The method of claim 6 wherein the permeability of K is derived from the equation:

$$K \cong c\phi^{m*}\overline{<A_i^2>}$$

where K is the permeability, c is a constant, $\phi$ is the fractional porosity, m* is the cementation exponent having a value between 1.5 and 2.5, and $\overline{<A_i^2>}$ is the mean square pore radius.

10. The method of claim 9 wherein logging measurements made with resistivity and density logging tools opposite the aforesaid formation are used to obtain the factor $\phi^{m*}$.

11. The method of claim 1 wherein said logging step consists of induced polarization measurements made in the frequency domain, at a plurality of frequencies, and said response function is a record of induced polarization phase shift versus frequency.

12. The method of claim 11 wherein said logging step consists of induced polarization frequency domain measurements made in the frequency range 0.001 Hz to 100 Hz.

13. The method of claim 11 wherein the permeability is determined from the following equation:

$$K \cong \frac{10^8 \, D}{2\pi f_{min}}$$

where K is the permeability, D is the diffusion constant for electrolyte ions in the formation brine at formation temperature, and $f_{min}$ is the frequency at which the frequency response function decreases substantially as $f^{1.0}$.

14. The method of claim 11 wherein the frequency response function is decomposed into a set of amplitudes and time constants using linear transforms and the resulting amplitudes and time constants are used in the method of claim 5.

15. The method of claim 11 wherein the induced polarization frequency domain measurements are made simultaneously at a plurality of frequencies using a waveform which is a superposition of the desired frequencies.

16. A method for determining in-situ the permeability of a formation surrounding a borehole, comprising:

logging the borehole with an induced polarization logging tool having at least one focused source electrode;

during said logging step applying current from said at least one focused source electrode to the borehole at a plurality of frequencies in the range 0.001 Hz to 100 Hz while the logging tool is opposite the formation of interest;

measuring the phase shift of the electric field produced by said current at the various frequencies;

transforming the phase shift versus frequency measurements into amplitude versus time;

determining the pore size distribution for N sizes from the expression:

$$A_i = \sqrt{DT_i}, \; i=1 \text{ to } N$$

wherein $A_i$ is the radius of the $i^{th}$ pore size, $T_i$ is the time constant for the $i^{th}$ pore size, and D is the electrolyte diffusion constant at formation temperature;

determining a capillary pressure histogram consisting of data pairs ($P_{ci}$, $S_i$) from the pore size distribution using the expression:

$$P_{ci} = \frac{2\gamma\cos\theta}{R_i} = \frac{2\gamma\cos\theta}{(A_i/h)}$$

wherein $P_{ci}$ is the capillary pressure, $\gamma$ is the interfacial tension between wetting and non-wetting fluids, $\theta$ is the contact angle, $R_i$ is the pore throat radius, and h is a constant relating pore throat radius to pore radius; and determining the permeability from the pore size distribution using the expression:

$$K = c\phi^{m^*} \overline{<A_i^2>}$$

where c is a constant, $\phi$ is the fractional porosity, $m^*$ is the cementation factor, and $\overline{<A_i^2>}$ is the mean square pore size.

17. A method for determining in-situ the permeability of a formation surrounding a borehole, comprising:
   logging the borehole with an induced polarization logging tool having at least one focused source electrode which emits current into said formation;
   measuring during said logging step the phase shift of the electric field produced by said current at a plurality of frequencies in the range 0.001 Hz to 100 Hz;
   determining the highest frequency $f_{min}$ at which the phase shift decreases substantially as $f^{1.0}$; and
   determining the permeability from the frequency $f_{min}$.

18. The method of claim 17 wherein the permeability is determined from the expression:

$$K \approx \frac{10^8 D}{2\pi f_{min}}$$

where K is the permeability, D is the diffusion constant for electrolyte ions in the formation brine at formation temperature, and $f_{min}$ is the frequency at which the frequency response function decreases substantially as $f^{1.0}$.

19. The method of claim 17 wherein the focused electrode array is adjusted to obtain separate vertical and horizontal permeabilities.

20. The method of claim 17 wherein the permeability is determined using a nomogram relating permeability and $f_{min}$.

21. The method of claim 1 wherein said logging step consists of measurements made using a focused electrode induced polarization logging tool, containing at least one focused source electrode.

22. The method of claim 21 wherein said focused electrode logging tool is focused alternately in a horizontal and vertical direction, and the permeability is determined separately in the horizontal and vertical directions.

23. The method of claim 1 wherein the induced polarization respons4 function is correlated with values of permeability obtained from core measurements to produce a direct output permeability log.

24. The method of claim 1 wherein the induced polarization response function is correlated with capillary pressure curves obtained from core measurements to produce a direct output capillary pressure curve.

25. The method of claim 17 wherein the induced polarization response function is correlated with values of permeability obtained from core measurements to produce a direction output permeability log.

26. The method of claim 17 wherein the induced polarization response function is correlated with capillary pressure curves obtained from core measurements to produce a direct output capillary pressure curve.

* * * * *